United States Patent [19]

Namiki

[11] Patent Number: 4,539,604
[45] Date of Patent: Sep. 3, 1985

[54] TRACKING SYSTEM IN A ROTARY MAGNETIC HEAD TYPE RECORDING AND/OR REPRODUCING APPARATUS

[75] Inventor: Yasuomi Namiki, Yokohama, Japan

[73] Assignee: Victor Company of Japan, Ltd., Yokohama, Japan

[21] Appl. No.: 516,186

[22] Filed: Jul. 21, 1983

Related U.S. Application Data

[63] Continuation of Ser. No. 260,593, May 6, 1981.

[30] Foreign Application Priority Data

May 7, 1980 [JP] Japan ................................ 55-60317

[51] Int. Cl.³ .............................................. G11B 21/10
[52] U.S. Cl. .................................. 360/10.2; 360/10.3; 360/77; 360/70; 360/75
[58] Field of Search ........................ 360/10, 70, 75, 77, 360/107, 109, 10.2, 10.1, 10.3

[56] References Cited

U.S. PATENT DOCUMENTS

| | | | |
|---|---|---|---|
| 3,821,787 | 6/1974 | Kihara | 358/4 |
| 4,203,140 | 5/1980 | Watanabe | 360/70 |
| 4,233,637 | 11/1980 | Kubata | 360/10 |
| 4,365,279 | 12/1982 | Kinjo | 360/77 |

FOREIGN PATENT DOCUMENTS

| | | | |
|---|---|---|---|
| 2552784 | 8/1976 | Fed. Rep. of Germany | 360/77 |
| 2328342 | 5/1977 | France | 360/77 |
| 2437755 | 4/1980 | France | 360/77 |
| 1560023 | 1/1980 | United Kingdom | 360/77 |
| 2060974 | 5/1981 | United Kingdom | 360/77 |

Primary Examiner—Alan Faber
Attorney, Agent, or Firm—Louis Bernat

[57] ABSTRACT

A rotary magnetic head type recording and/or reproducing apparatus to which a tracking system can be applied, comprises two rotary heads provided opposing a rotary body for alternately and successively recording signals on oblique tracks in a recording medium with respect to the longitudinal direction of the recording medium or for alternately scanning over tracks in the recording medium to reproduce recorded signals, moving mechanism for continuously moving the recording medium, a head moving mechanism for displacing the two rotary heads substantially at the same time in mutually opposite directions by the same amount in a plane which is perpendicular to the rotating plane of the rotary heads, in response to a driving signal supplied from the exterior, and a control head for recording a control pulse having a predetermined period onto the recording medium. The tracking system comprises a driving signal producing circuit for producing a driving signal from a pulse obtained by detecting the rotation of the rotary body and a control pulse reproduced from the control head, upon reproduction in which the recording medium is continuously moved at a speed different from that upon recording by the moving means and supplying means for supplying the driving signal from the driving signal producing circuit to the head moving mechanism.

5 Claims, 68 Drawing Figures

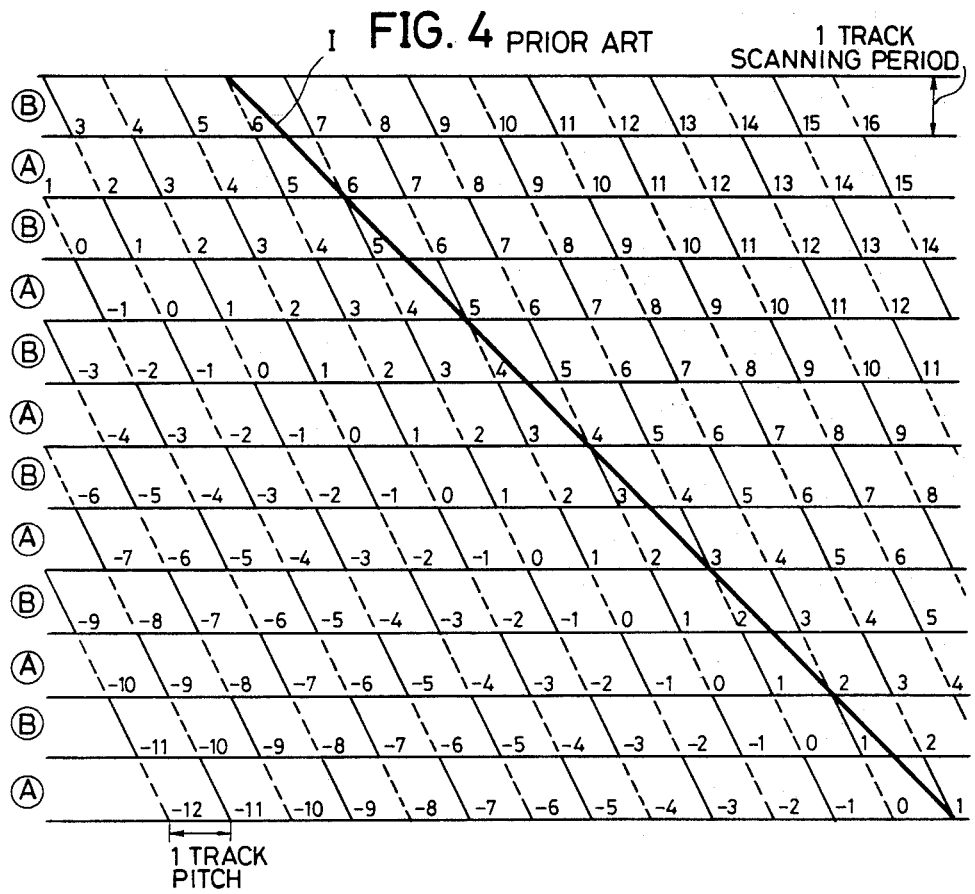
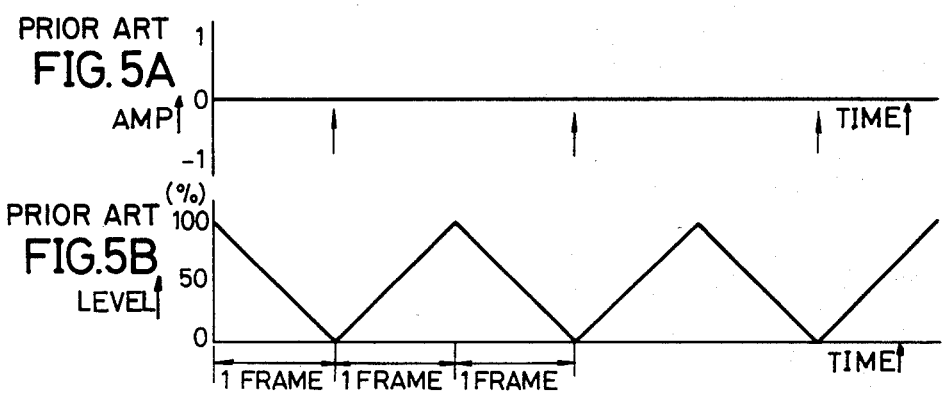

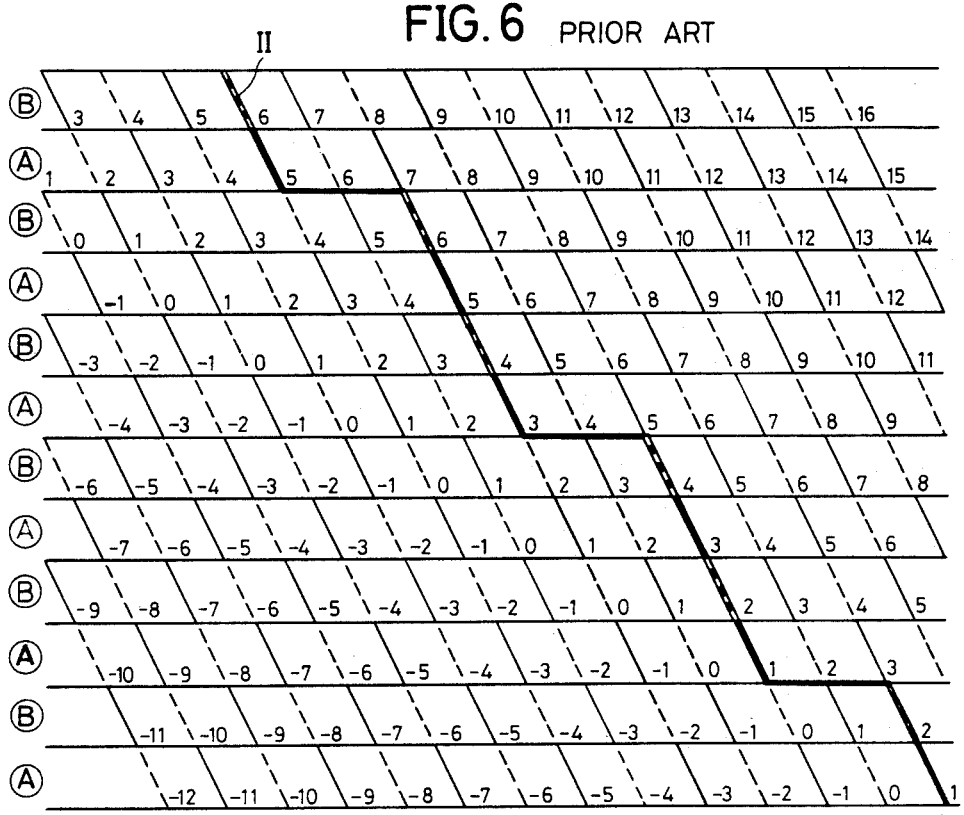
FIG. 6 PRIOR ART
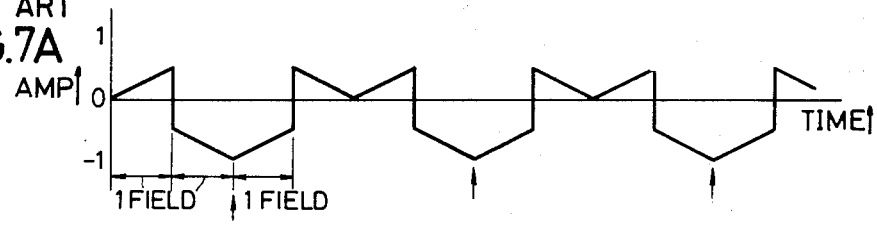
PRIOR ART FIG. 7A
PRIOR ART FIG. 7B

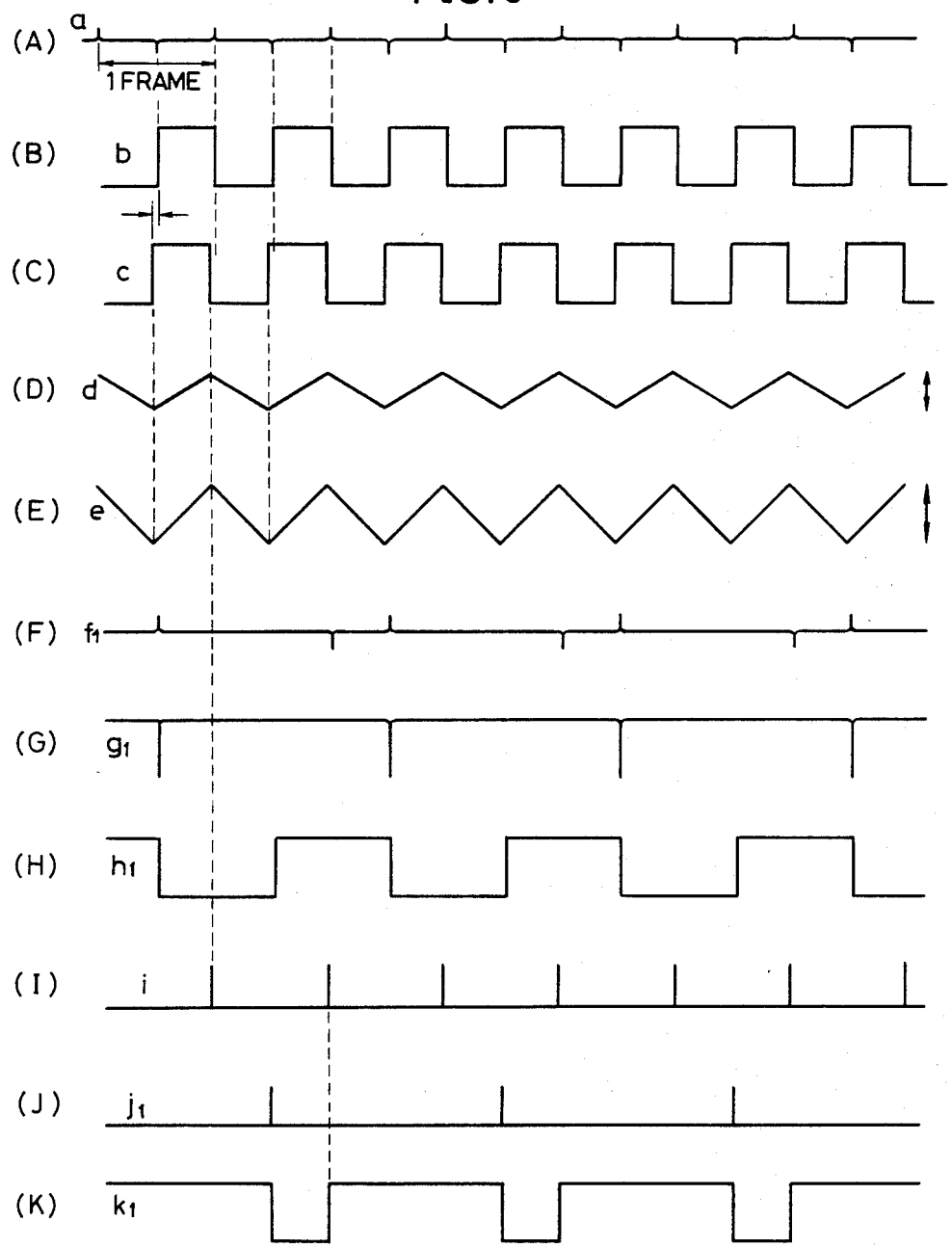

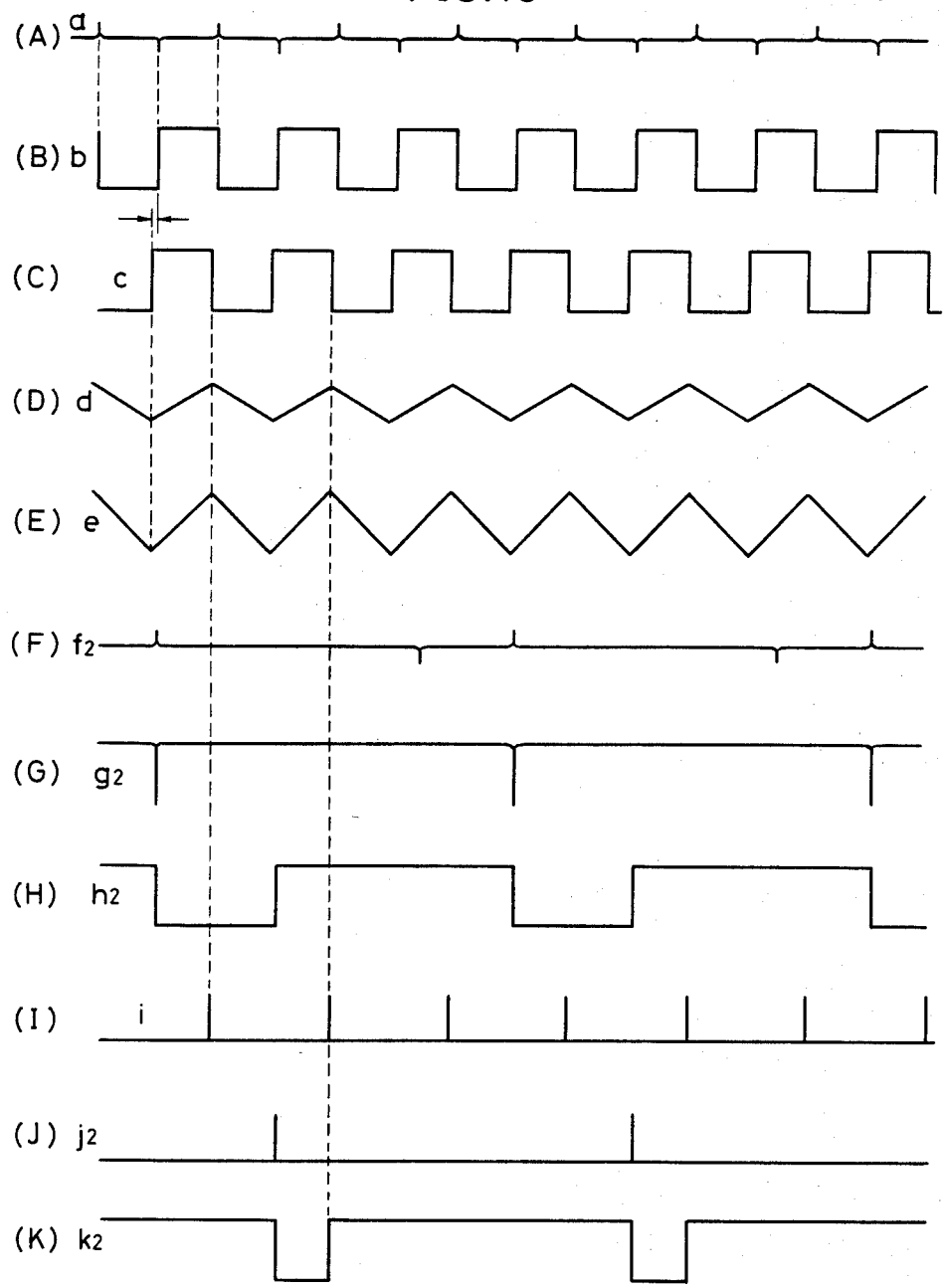

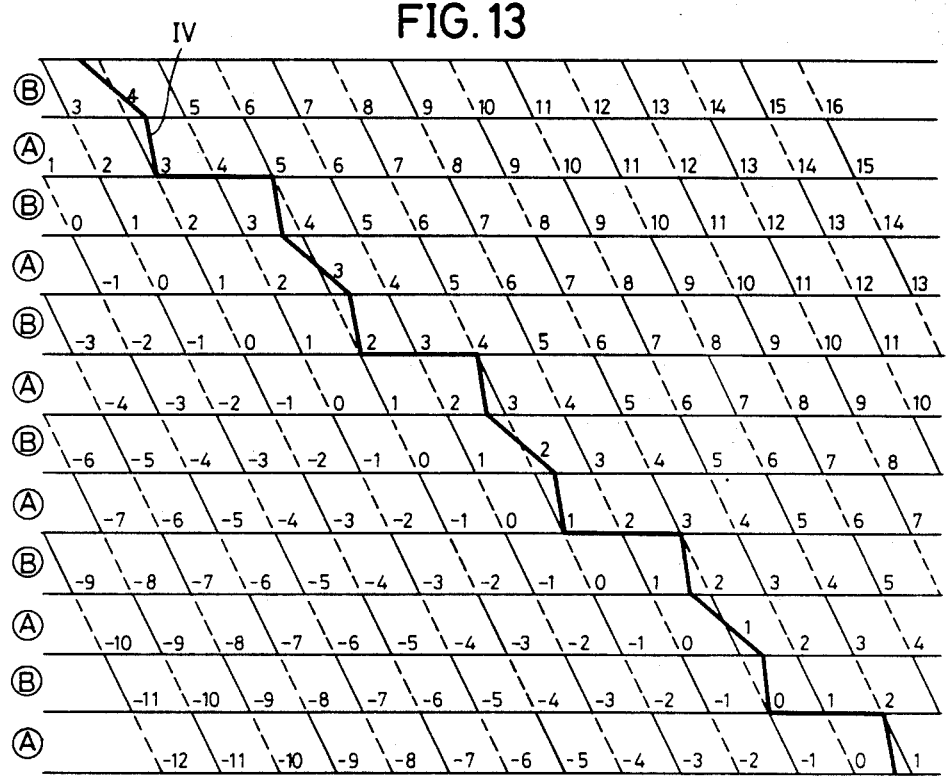
FIG. 13
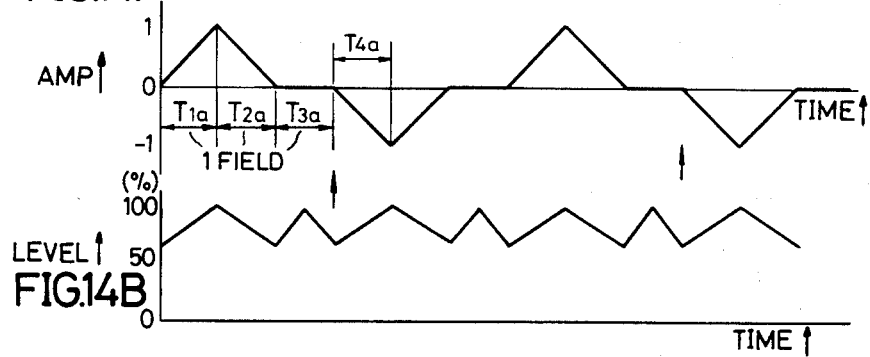
FIG.14A
FIG.14B

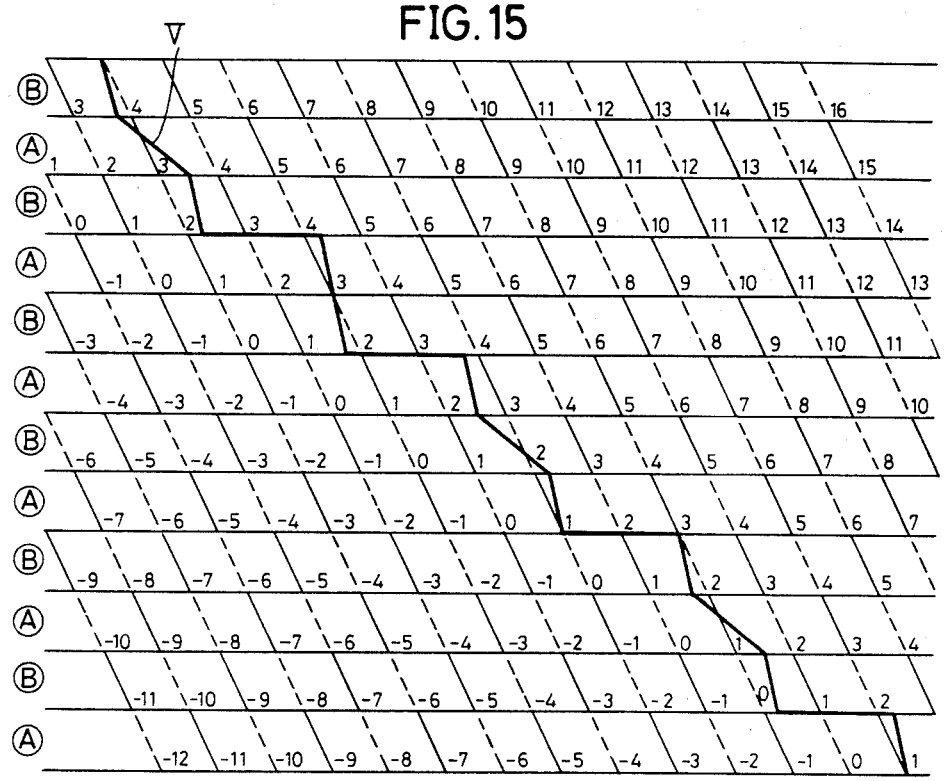
FIG. 15
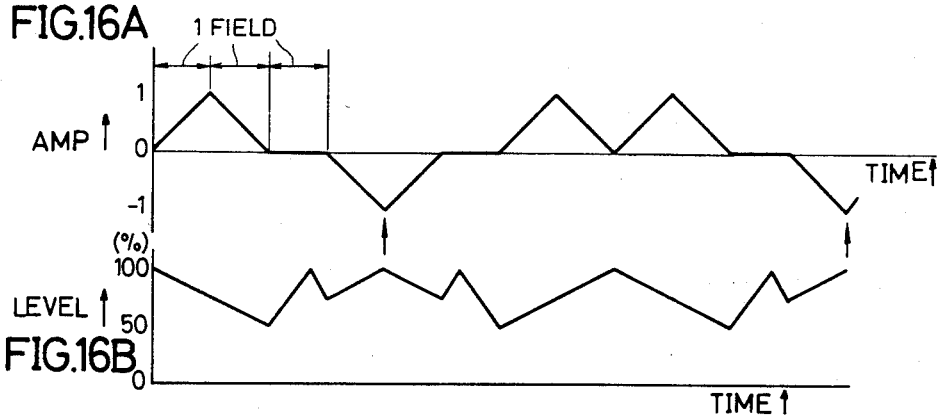
FIG. 16A
FIG. 16B

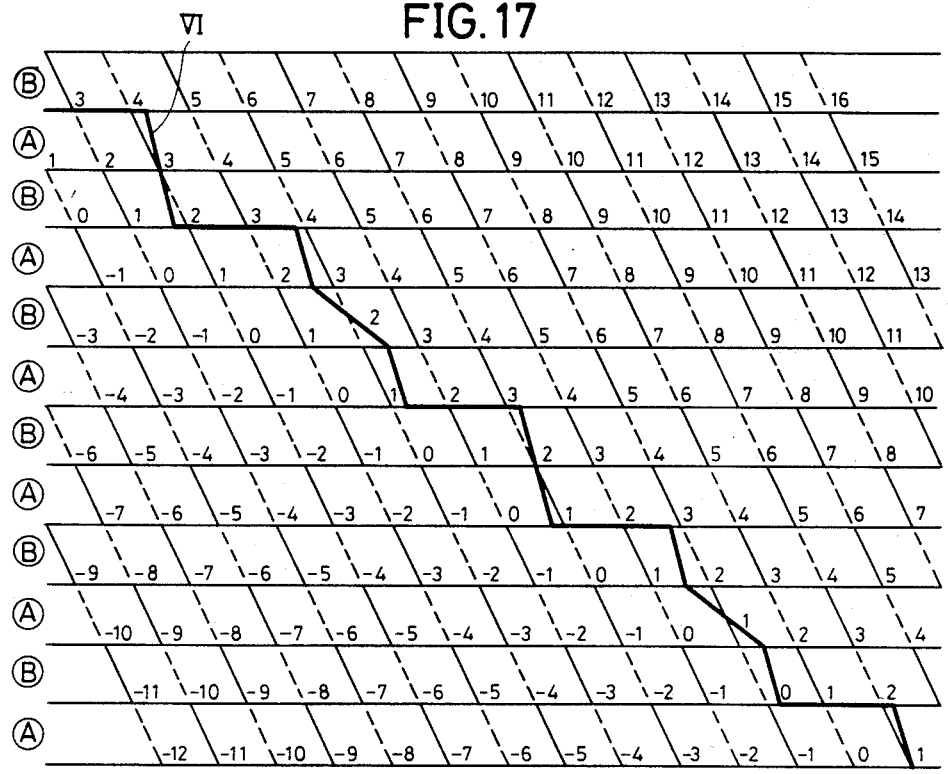
FIG. 17
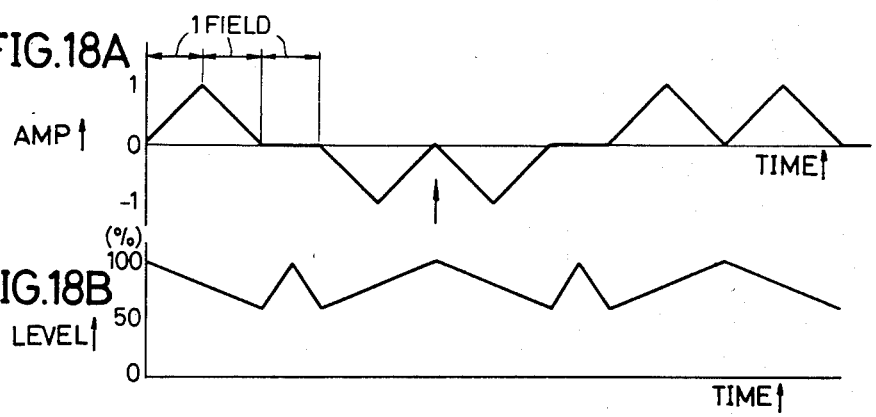
FIG. 18A
FIG. 18B

TRACKING SYSTEM IN A ROTARY MAGNETIC HEAD TYPE RECORDING AND/OR REPRODUCING APPARATUS

This is a Continuation of U.S. patent application Ser. No. 260,593, filed May 6, 1981, entitled "TRACKING SYSTEM IN A ROTARY MAGNETIC HEAD TYPE RECORDING AND/OR REPRODUCING APPARATUS".

BACKGROUND OF THE INVENTION

The present invention relates generally to tracking system in rotary magnetic head type recording and/or reproducing apparatuses, and more particularly to a tracking system which can be applied to a magnetic recording and/or reproducing apparatus having a head moving mechanism for displacing a pair of rotary magnetic heads provided at mutually opposing positions, in mutually opposite directions along a plane which is perpendicular to the rotating plane of the two rotary magnetic heads.

A system wherein tracks are formed on a tape without gaps of guard bands between adjacent tracks has been previously developed. Moreover, a color video signal can be recorded and reproduced on such a tape without the occurrence of an interference beat disturbance. This system is described in U.S. patent application Ser. No. 731,935 (Now U.S. Pat. No. 4,178,606) entitled "Color video signal recording and/or reproducing system" filed Oct. 13, 1976, and assigned to the assignee of this application. In this previously developed system, a pair of azimuth heads have gaps which are inclined with a certain azimuth angle, in mutually opposite directions with respect to a direction perpendicular to the longitudinal direction which is of the track. Adjacent tracks are formed in contiguous contact side-by-side without a gap or guard band therebetween. The phase of the chrominance signal is shifted by 90 degrees for every horizontal scanning period. The direction of this phase shifting is reversed from one track to the next adjacent track. In accordance with this system, the tape utilization efficiency is high since the tracks are in close contact with each other. Moreover, there is no beat disturbance.

The prior art employs a system wherein a video signal is recorded on a magnetic tape in parallel tracks, formed obliquely to the longitudinal direction of the magnetic tape. This tape may either be stopped or transported at different speeds at the time of playback in order to carry out a speed-change in the reproduction, such as quick-motion reproduction, slow-motion reproduction, or still picture reproduction. In this known system, the tape travel speed at the time of reproduction is different from that at the time of recording. The tracing locus of the rotary head relative to the tape during reproduction differs from the tracing locus (track) of the rotary head during recording, whereby so-called tracking error occurs.

In the proposed system mentioned above, when tracking error occurs as a result of reproduction at changed speed, a so-called reverse tracking, in which one of the heads traces a part of a track recorded by a head having the same azimuth as the other head, occurs partially. With respect to this part traced by reverse tracking, there is almost no reproduction of the recorded signal because of azimuth loss. For this reason, when tracking error occurs, the reproduced signal level drops, and, in accordance with this, a noise component due to a reduction of the reproduced signal level accompanying tracking error will appear at irregular positions on the reproduced picture screen. For this reason, the noise part in the picture moves, and the S/N ratio of the entire picture becomes poor. Consequently, a speed-change reproduced picture cannot be obtained in good picture quality.

Accordingly, as a system for correcting for tracking error at the time of changed-speed reproduction, a control system in which a head moving mechanism is provided respectively for a pair of rotary magnetic heads on a rotary structure, and the magnetic heads are caused to undergo displacement by the head moving mechanism, whereby each rotary head accurately carries out correct tracking, has been proposed.

On the other hand, recently in helical scan type magnetic recording and/or reproducing apparatuses for home use (hereinafter referred to as VTRs) having rotary magnetic heads, high-density recording and reproduction is being developed due to improvements in the magnetic tape and increased density in the rotary magnetic heads. Accordingly, VTRs have been realized which are capable of performing a long duration recording or reproduction such as a six-hour recording or reproduction by use of a conventional magnetic tape for performing two hours of recording or reproduction, for example, by reducing the tape speed, track pitch, and the like, to one-third that of the conventional system. However, since the tape driving system in the VTR for home use is simplified in order to reduce the cost, it is difficult to stably maintain the desired tracking accuracy by following and scanning along the curves in the video track, due to the increased density in the recording and reproduction. Especially upon a so-called interchanged reproduction in which a magnetic tape recorded by a certain VTR is reproduced by another VTR, it is even more difficult to stably maintain the above tracking accuracy, and a desirable picture quality could not be obtained.

Therefore, a precise tracking control of the magnetic heads is required so that the magnetic heads trace exactly on the tracks, especially for high density recording and/or reproduction. The head moving mechanism is also effectively applicable to meet with the above described requirement. In this head moving mechanism, the rotary magnetic heads are displaced in a plane which is perpendicular to the rotating plane of the magnetic heads, in a direction perpendicular to the longitudinal direction of the track. As the above described head moving mechanism, there are types which use piezoelectric elements respectively provided at a plurality of rotary magnetic heads, and types which perform a so-called see-saw operation like the head moving mechanism proposed in a U.S. patent application Ser. No. 178,852 entitled "MAGNETIC RECORDING AND REPRODUCING APPARATUS WITH DEVICE FOR TRACKING CONTROL OF ROTARY MAGNETIC HEADS" filed Aug. 18, 1980, issued Dec. 21, 1982 as U.S. Pat. No. 4,365,279, in which the assignee is the same as that of the present application.

In the system which uses piezoelectric elements in each of the plurality of rotary magnetic heads, the rotary magnetic heads are controlled so as to accurately perform positive tracking, by separately displacing each of the rotary magnetic heads. However, in this control system, it is necessary to provide a piezoelectric element in each of the rotary magnetic heads, and the construction of the system accordingly becomes complex. Furthermore, in a case where inconsistencies exist in the operations of the piezoelectric elements, this system was disadvantageous in that not all of the rotary magnetic heads can be finely controlled to perform accurate positive tracking.

On the other hand, in the proposed system using the see-saw operation, when one rotary magnetic head is moved by a predetermined amount in a predetermined direction, the other rotary magnetic head moves in a direction opposite to the above predetermined direction by an amount equal to the above predetermined amount. Thus, under the same condition in which the diameter of the drum is identical, the movable range of the rotary magnetic heads can be made larger than that in the above system using the piezoelectric elements. Accordingly, even when the variable speed ratio is large, a reproduced picture can be obtained having no noise bar upon special reproduction modes. However, since a permanent magnet part and a yoke part are required in order to perform the see-saw operation, the weight of the head moving mechanism increases. Hence, even when a driving current respective of the tracking error is provided by use of a closed loop servo loop to perform the tracking control, the responses of the rotary magnetic heads become slow in following and tracing the tracks. Moreover, the waveform of the above driving current was complex, and difficult to form. Furthermore, in order to obtain a 1/N (N is an integer) speed slow-motion reproduction picture, by scanning a track on a magnetic tape which is continuously moved at a tape speed equal to 1/N times the tape speed upon recording, a part where the differentiated value is infinity is required in the driving current waveform. That is, a part which shows a finite change although the time is zero, is required in the driving current waveform. In addition, this system was disadvantageous in that the system was sensitive to phase deviation, and thus, stable tracking operation could not be obtained.

On the other hand, a method of performing a slow-motion reproduction in which no noise bar is introduced, has also been proposed for a helical scan type VTR having no head moving mechanism and using an azimuth recording and/or reproducing system requiring no guard bands. In this proposed method, it was perceived that there were positions at which still picture reproduction can be performed without introducing noise, even though the rotary magnetic heads crosses the border between the tracks. Therefore, by this proposed method, reproduction is performed in the so-called noiseless still picture reproducing position, and the magnetic tape is moved so that the movement of the magnetic tape is in synchronism with the rotation of the rotary magnetic heads, and so that the rotary heads do not cross the border between the tracks. Next, reproduction is performed at another noiseless still picture reproducing position by use of a control signal, and the above operation is repeatedly performed. Accordingly, by varying the time ratio at which the above described operation is repeated, the desired slow-motion ratio can be obtained. According to this proposed method, the cost of the system is low since no head moving mechanism is required, and the system can be suitably applied to a VTR for home use.

However, in this proposed method, some instability of the picture is introduced, since the magnetic tape is moved intermittently. Moreover, some undesirable effects are introduced, due to the necessity to use rotary magnetic heads having substantially large track widths compared to the width of the recording track.

SUMMARY OF THE INVENTION

Accordingly, a general object of the present invention is to provide a novel and useful tracking system in which the above described problems have been overcome.

Another and more specific object of the present invention is to provide a tracking system which can be applied to a magnetic recording and/or reproducing apparatus having a head moving mechanism which displaces a pair of rotary magnetic heads provided at mutually opposite positions in a plane perpendicular to the rotating plane of the rotary magnetic heads, along mutually opposite directions.

Still another object of the present invention is to provide a tracking system which is capable of obtaining a high quality slow-motion reproduction picture having no noise bar and no instability of the picture, by use of an open loop servo which applies a driving signal formed from the information supplied by drum pulses and control pulses obtained upon reproduction, to a head moving mechanism.

Further objects and features of the present invention will be apparent from the following detailed description when read in conjunction with the accompanying drawings.

BRIEF DESCRIPTION OF THE DRAWINGS

FIG. 4 is a diagram for explaining scanning locus of a rotary head with respect to recording tracks, when the rotary head is held at a neutral position and reproduction is performed with a tape speed of ½ times the tape speed upon recording;

FIGS. 5A and 5B are respectively a graph showing an example of a driving current waveform which is applied to the head moving mechanism, when the rotary head is held at the neutral position and reproduction is performed with the tape speed of ½ times the tape speed upon recording, and a diagram showing a variation in an FM signal level reproduced by the rotary head for the case shown in FIG. 4;

FIG. 6 is a diagram for explaining a scanning locus of the rotary head with respect to recording tracks so that the reproduced FM signal level becomes 100%, when the tape speed is ½, times the tape speed upon recording;

FIGS. 7A and 7B are respectively a graph showing a driving current waveform which is supplied to the head moving mechanism in order to perform the scanning operation shown in FIG. 6, and a diagram showing a variation in the FM signal level reproduced by the rotary head for the case shown in FIG. 6;

FIGS. 11, 13, 15, and 17 are respectively diagrams for explaining scanning loci of rotary magnetic heads with respect to recording tracks, when reproduction is performed according to the tracking system of the present invention with respective tape speeds of ½, ⅓, ¼, and 1/5 the tape speed upon recording;

FIGS. 12A, 14A, 16A, and 18A are respectively graphs showing driving current waveforms which are supplied to the head moving mechanism in order to perform scanning operations shown in FIGS. 11, 13, 15, and 17;

FIGS. 12B, 14B, 16B, and 18B are respectively diagrams showing variations in the FM signal levels reproduced by the rotary heads for the cases shown in FIGS. 11, 13, 15, and 17;

DETAILED DESCRIPTION

First, description will be given with respect to an example of a previously proposed head moving mechanism which can be used for the system of the present invention, in conjunction with FIGS. 1 through 3.

Figure 1:
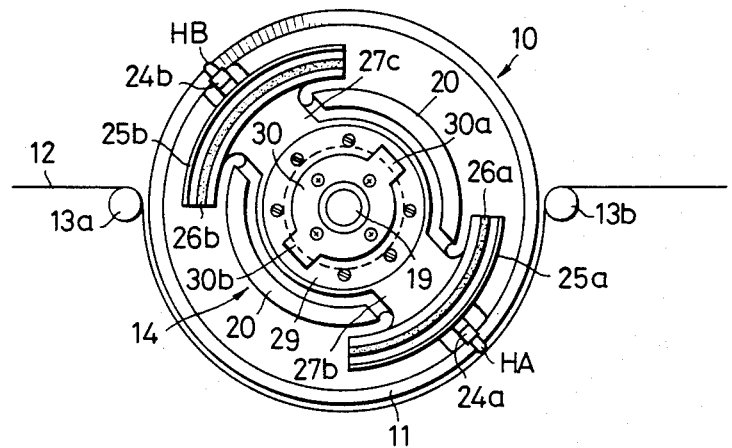
FIG. 1 is a plan view showing an example of a previously proposed head moving mechanism.
Figure 2:
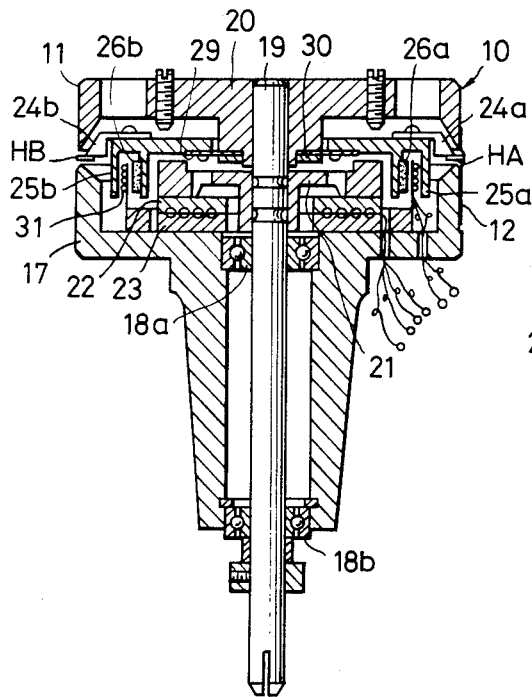
FIG. 2 is a cross-sectional view of an example of a drum assembly having the head moving mechanism shown in FIG. 1.
Figure 3:
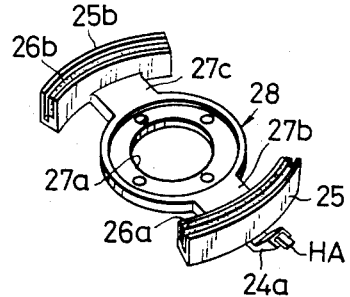
FIG. 3 is a perspective view showing an essential part of the head moving mechanism shown in FIG. 1.

In FIGS. 1 and 2, a magnetic tape 12 makes contact with the peripheral surface of a guide drum 10 throughout an angle range which is larger than 180 degrees, by guide poles 13a and 13b. Thus, accompanied by the rotation of a rotary upper drum 11, a head moving mechanism 14 rotates unitarily therewith. Furthermore, the rotary upper drum 11 is fixed to the upper end of a rotary shaft 19 which is axially supported by bearings 18a and 18b provided within a fixed lower drum 17. The rotary shaft 19 penetrates the center portion of the fixed lower drum 17. When the rotary shaft 19 is rotated due to the rotation of a drum motor (not shown), the rotary upper drum 11 is rotated at a predetermined rotational speed of 1800 rpm, for example.

A projection of a bushing 20 is embeddedly fixed at the center portion of the rotary upper drum 11 as shown in FIG. 2. Moreover, the rotary shaft 19 is movably embedded at the center portion of a flywheel 21. The flywheel 21 is constructed to unitarily rotate with the rotary shaft 19, and is fixed to a rotary winding portion 22 of a rotary transformer. The flywheel 21 forms a small gap between a fixed winding portion 23 of the rotary transformer which is mounted on the fixed lower drum 17.

A pair of rotary magnetic heads (hereinafter simply referred to as rotary heads) HA and HB are connected so as to respectively oppose arcuate yokes 25a and 25b made of ferromagnetic material by an angle of 180 degrees, through head brackets 24a and 24b which are made of nonmagnetic material. The yokes 25a and 25b are of U-shaped cross-section, and respectively comprise permanent magnets 26a and 26b therein. It is obvious that the yokes 25a and 25b are respectively provided, to prevent the magnetic flux of the permanent magnets 26a and 26b from introducing bad effects to the rotary heads HA and HB. In addition, the yokes 25a and 25b are respectively interconnected by plates 27b and 27c made of ferromagnetic material. These plates 27b and 27c unitarily comprise an opening 27a at the center portions, to form a rotary base 28 as shown in FIG. 3. The opening 27a of the rotary base 28 is inserted with the rotary shaft 19, and is freely movable together with a central hole of a supporting member 29. Furthermore, the rotary base 28 is unitarily and fixedly connected to the bushing 20, through the supporting member 29. The rotary base 28 is rotated so as to perform the so-called see-saw operation in the vertical direction with respect to FIG. 2, by having fulcrum projections 30a and 30b of a fulcrum member 30 as the fulcrum. The central hole of the fulcrum member 30 is fixed to the projection of the bushing 20. Therefore, when the rotary head HA moves by a specific amount in the upward (or downward) direction in FIG. 2, the rotary head HB moves by the same specific amount in the downward (or upward) direction.

The above described rotation (see-saw operation) of the rotary base 28 is performed by use of an electromagnetic force in conformance with the known Fleming's left-hand rule, which is introduced due to the inter-relative operation between the driving current applied to a driving coil 31 which is wound around a cylindrical bobbin inserted into the space having U-shaped cross-section of the yokes 25a and 25b, and the magnetic field introduced by the permanent magnets 26a and 26b, so that the rotary heads incline towards certain directions by a certain amount according to the size and polarity of the above driving current. This rotational operation of the rotary base 28 is independently performed even when the rotary base 28 unitarily rotates with the rotary upper drum 11.

The tracking system according to the present invention can of course be applied to the above described head moving mechanism, however, the tracking system according to the present invention can also be applied to other head moving mechanisms which move a pair of rotary heads which are provided at opposing positions, in mutually opposite directions within a plane perpendicular to the rotating plane of the rotary heads. Moreover, the present invention relates to a tracking system for obtaining a 1/N speed slow-motion reproduction picture, and performs tracking control by use of open loop servo driving control.

When the magnetic tape is moved at a speed which is ½ that upon recording, and the rotary heads HA and HB shown in FIGS. 1 and 2 are rotated at rotational speeds which are the same as those upon recording, upon reproduction performed by the magnetic recording and/or reproducing apparatus, the rotary heads HA and HB scan the magnetic tape as shown by a thick solid line I shown in FIG. 4. When the rotary heads HA and HB are held at height positions identical to those upon recording (neutral positions) without displacing and controlling the rotary heads HA and HB to scan the recording tracks. In FIG. 4, the solid line I indicates the center line of the scanning locus of the rotary heads HA and HB. The sloping solid lines excluding the solid line I indicate the center line of the track which is recorded with a rotary head having the same azimuth angle as the rotary head HA, and the sloping dotted lines indicate the center line of the track which is recorded with a rotary head having the same azimuth angle as the rotary head HB which has an azimuth angle different from that of the rotary head HA. Furthermore, the numbers shown in FIG. 4 respectively indicate the recording order (track number) of the track which is recorded obliquely on the magnetic tape with respect to the longitudinal direction of the magnetic tape. Accordingly, when it is assumed that reproduction is started from a track number "0", the track number "−1" indicates a recording track which is one track before the track "0", and the track number "1" indicates a recording track which is one track after the track "0". Moreover, symbols " A " and " 11" which are respectively shown vertically on the left hand side in FIG. 4, show which rotary head is reproducing the recorded signal and the corresponding reproducing period. It is assumed that reproduction is performed from the bottom towards the upward direction in FIG. 4.

As shown in FIG. 4, upon ½ speed slow-motion reproduction, when the reproduction is performed from the track number "1", for example, the rotary head HA first reproduces the track "1", and the rotary head HB reproduces the track "2" in the following track scanning period. In addition, the rotary head HA reproduces the track "1" in the next track scanning period, and from then on, the rotary heads HA and HB alternately perform reproduction every one track scanning period, to successively reproduce the tracks "2", "3", "4", "3", "4", "5", "6", "5", and "6". At this point, the driving current which is supplied to the head moving mechanism 14 is zero as shown in FIG. 5A, and the rotary heads are not displaced. In FIG. 5A, arrows respectively show the rising positions of control pulses which will be described hereinafter.

After the reproduciton is started, the rotary head HA is moved to a position to scan the whole width of the track "1" which is recorded by a rotary head having the same azimuth angle as that of the rotary head HA. However, the area of the track width portion which scans the track "1" decreases as the scanning progresses, and at the final position where the scanning of that particular track is finished, the rotary head HA is in a position to scan substantially half the track width. Furthermore, the rotary head HB next starts to scan from a position to scan half the tracks "1" and "2", and at the final position where the scanning of that particular track is finished, the rotary head HB is in a position to scan the whole width of the track "1" which is recorded by a rotary head having an azimuth angle different from that of the rotary head HB. The rotary head HA then makes contact with the magnetic tape, however, at this point, the rotary head HA is in a position to scan the whole track width of the track "2" which is recorded by a rotary head having an azimuth angle different from that of the rotary head HA. Accordingly, as the scanning operation progresses, the scanning area of the track "1" which is recorded by a rotary head having the same azimuth angle as that of the rotary head HA, which is scanned by the rotary head HA increases. Therefore, at the final position where the scanning of that particular track is finished, the rotary head HA is in a position to scan substantially half the track width of the track "1". By repeating the above described operation in the similar manner, the rotary heads HA and HB respectively having the same track pitch and track width, continue to perform the scanning operation.

As is well known, rotary heads HA and HB respectively reproduce recorded signals from only the tracks which are recorded by rotary heads respectively having the same azimuth angle as that of their own, and the tracks which are recorded by use of rotary heads having different azimuth angles as their own are accordingly not reproduced due to the azimuth loss. Hence, assuming that one field of video signals are frequency modulated (FM) and recorded on one track, the reproduced level upon ½ speed slow-motion reproduction changes as shown in FIG. 5B. In this case, the ½ speed slow-motion reproduction picture is obtained, however, as seen in FIG. 5B, the reproduced FM level becomes zero or very small every scanning period of two frames. Thus, this appears as noise bar in the reproduced picture, and the reproduced picture accordingly becomes unpleasant to watch.

For other slow-motion reproductions of slow-motion ratios of ⅓, ¼, 1/5 , —, operations thereof will be easily understood from the above described description of the slow-motion reproduction of slow-motion ratio of ½.

Therefore, when the displacement quantity of the rotary heads HA and HB in a plane which is perpendicular to the rotating plane of the rotary heads is maintained at zero, and the magnetic tape is moved at a speed which is 1/N (N is an integer) times that upon recording to perform 1/N speed slow-motion reproduction, the reproduced FM level periodically becomes zero or very low level. Accordingly, the slow-motion reproduction picture becomes an unpleasant picture comprising noise bar.

Thus, there is a system in which a driving current having a waveform shown in FIG. 7A is applied to the driving coil 31 shown in FIG. 2, in order to reduce the tape speed to ½ times that upon recording. In this case, the rotary heads HA and HB respectively perform scanning along a scanning locus indicated by a thick solid line II in FIG. 6. Accordingly, the rotary heads HA and HB always scan the whole width of the track which is recorded by rotary head having the same azimuth angle as their own. In addition, according to this system, the reproduced FM signal level obtained is theoretically 100%.

Description will now be given with respect to a case where a ½ speed slow-motion reproduction is performed according to this system. When the tape is continuously moved at a speed which is ½ times that upon recording, and the driving current having the waveform shown in FIG. 7A is used, the rotary head HA is moved at a position coinciding with the center line of the track "1" upon starting of the reproduction, for example. Therefore, the rotary head HA is gradually displaced towards track "2" (towards the upward direction) as the scanning operation progresses, and at the final position where the scanning of the first one track is finished, the rotary head HA is displaced towards the upward direction by ½ track pitch. Accordingly, the rotary head HA always scans over the track "1".

Next, the rotary head HB is displaced and driven so as to scan and reproduce the track "2" which is recorded by a rotary head HB. However, at the final scanning position of the rotary head HA on the track "1" , the rotary head HA is controlled so as to shift towards the upward direction by ½ track pitch, and the rotary head HB is at a position shifted by ½ track pitch towards the downward direction. Thus, if the driving current is not varied, the rotary head HB will start scanning over the track "1" which is a reverse track. Hence, the polarity of the driving current is reversed as shown in FIG. 7A, in order to shift the rotary head HA towards the downward direction by ½ track pitch when the reproduction performed by the rotary head HB is started (the rotary head HB is shifted towards the upward direction by ½ track pitch). The rotary head HB is thus positioned at the starting position of track "2" to scan the whole width of the track. Furthermore, by gradually shifting the rotary head HA towards the downward direction, and setting the driving current so that the rotary head HB is moved to a position shifted towards the downward direction by one track pitch at the final scanning position of track "2", the rotary head HB scans the track "2" in such a manner so that the scanned area of the track becomes maximum.

Next, the rotary head HA begins to make contact with the magnetic tape, however, at this point, the rotary head HA is at a position shifted by one track pitch towards the downward direction, and accordingly is placed at a position where the center line of track "1" which is recorded by a rotary head having the same azimuth angle as that of the rotary head HA and the center line of the track width coincide, and the reversal of the driving current polarity is not performed as in the above described case. Therefore, at the final scanning position of track "1", the rotary head HA is gradually displaced towards the upward direction so as to be displaced by $\frac{1}{2}$ track pitch towards the upward direction. Hence, when the tape speed is set at $\frac{1}{2}$ that upon recording, the rotary heads HA and HB are respectively controlled of the tracking, and scan along the thick solid line II shown in FIG. 6.

However, in this system, the waveform of the driving current is complex and difficult to produce, and stable tracking operation cannot be obtained. Accordingly, in the tracking system of the present invention, the driving signal which is to be applied to the head moving mechanism 14 is produced from the information supplied by the control pulse used for drum pulses and capstan servo, by use of an open servo loop. Hence, a high quality slow-motion reproduction picture can be obtained.

Figure 8:
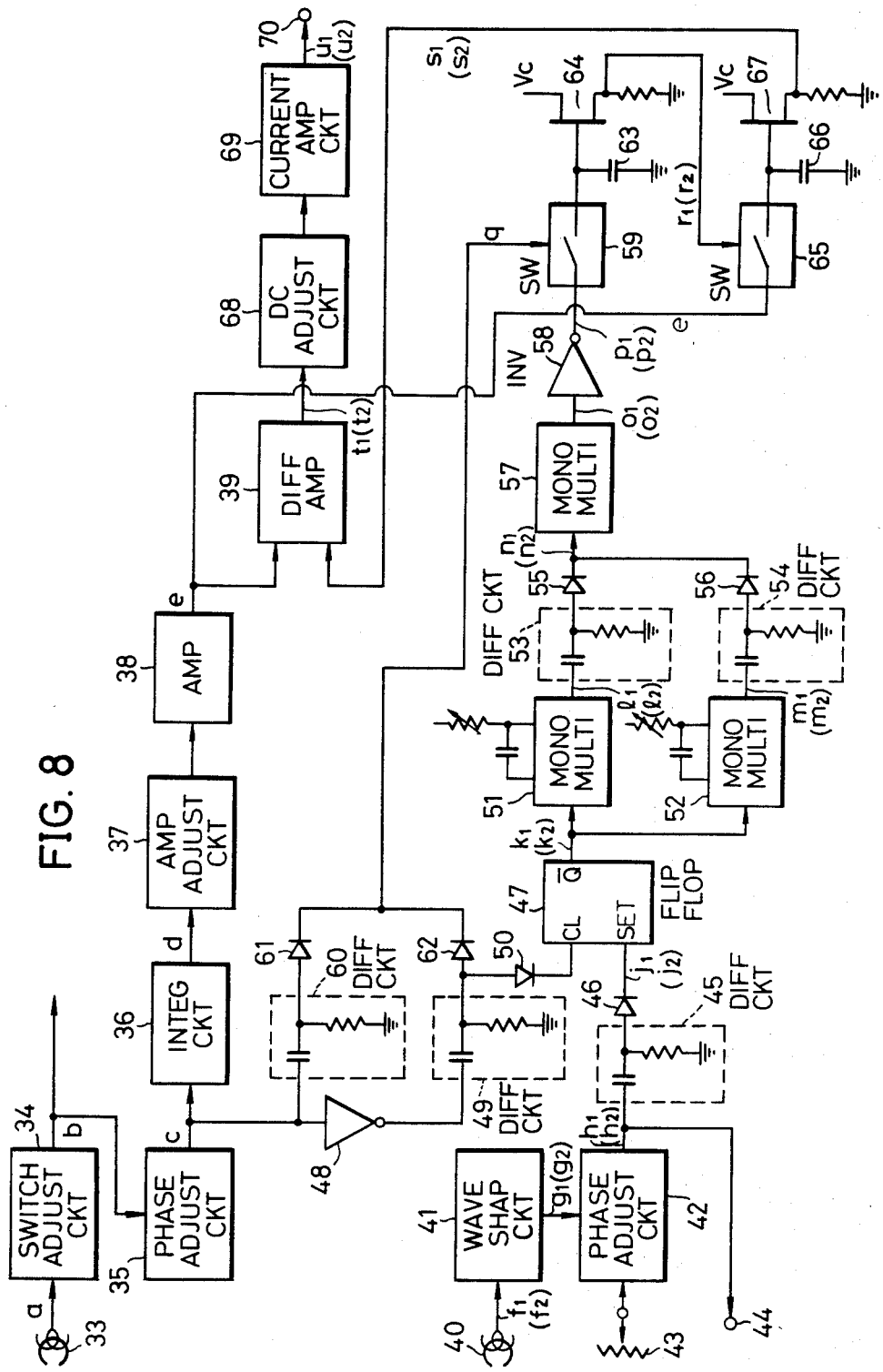
FIG. 8 is a systematic circuit diagram showing an essential part of an embodiment of the tracking system according to the present invention.
Figure 9:
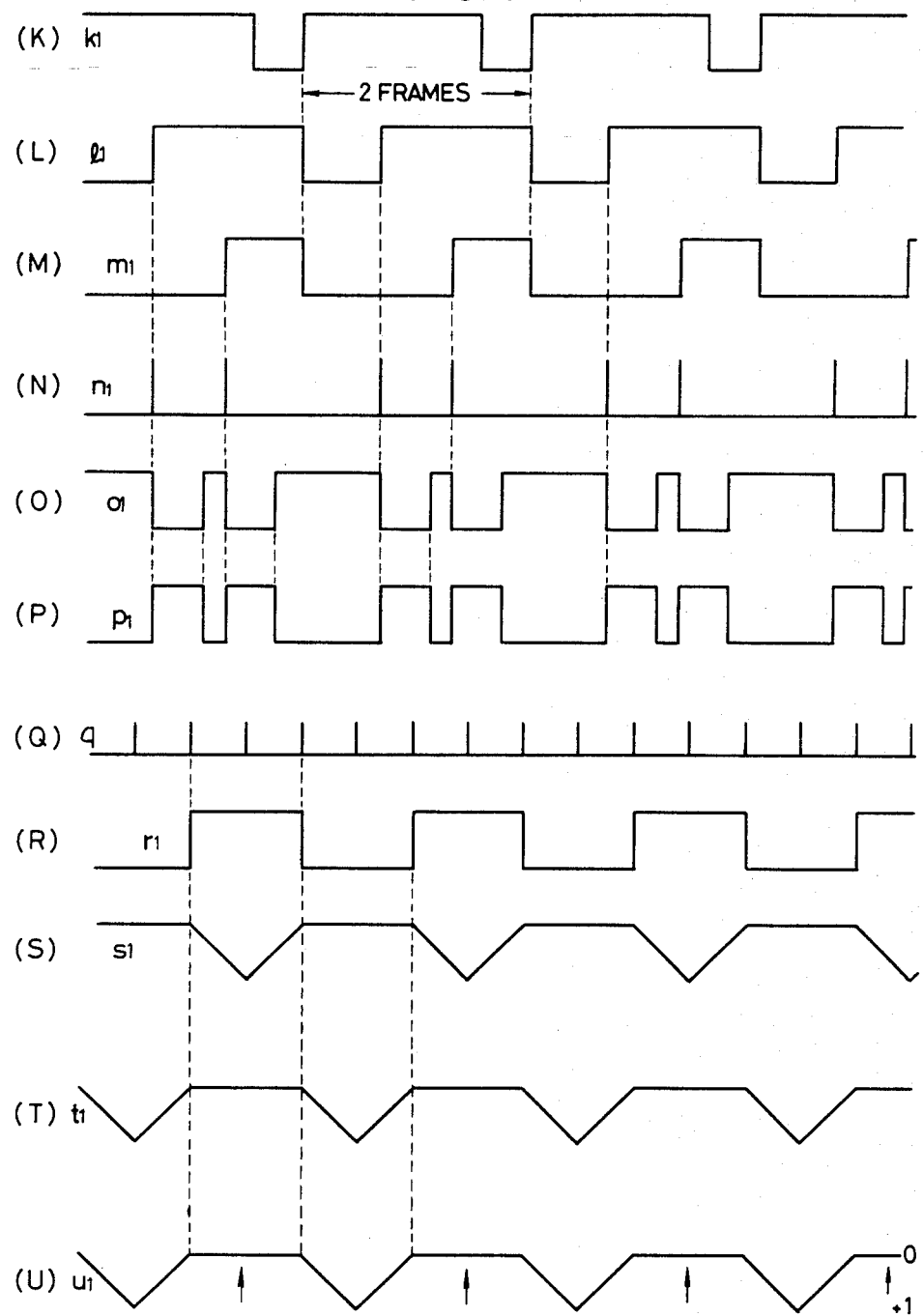
FIG. 9(A) through 9(U) and FIGS. 10(A) through 10(U) are respectively graphs showing signal waveforms at various parts of the circuit system shown in FIG. 8, for explaining the operation of the circuit system shown in FIG. 8 when reproduction is performed with the tape speed of ½ and ⅓ times the tape speed upon recording.

FIG. 8 is a systematic circuit diagram showing an embodiment of an essential part of the tracking system according to the present invention. In FIG. 8, a drum pulse a shown in FIG. 9(A) or 10(A) having a repetition frequency of 30 Hz, for example, which is supplied from a drum pulse pickup head 33, is supplied to a switching adjusting circuit 34 wherein the pulse a is converted into a square wave signal b as shown in FIG. 9(B) or 10(B). This square wave signal b is supplied to a known drum servo circuit (not shown) of a helical scan type VTR on one hand, and supplied to a phase adjusting circuit 35 on the other. Phase adjustment is performed in the phase adjusting circuit 35 in order to compensate for the erroneous scanning performed due to the head moving mechanism 14, and the square wave b is thus converted into a square wave C shown in FIG. 9(C) or 10(C).

Since a time lag (0.14 fields, for example) exists from the time a driving current $\mu1$ (or $\mu2$), which will be described later, is applied to the head moving mechanism 14 until the heads are actually displaced due to the erroneous operation of the head moving mechanism 14, the above phase adjusting circuit 35 is provided to compensate for the time lag and supply the driving current $\mu1$ (or $\mu2$) beforehand. The square wave c is converted into a triangular wave d shown in FIG. 9(D) or 10(D) by an integrating circuit 36, and supplied to an amplitude adjusting circuit 37 for obtaining the most suitable head displacing quantity. The output of the amplitude adjusting circuit 37 is supplied to an amplifier 38, and an output triangular wave e shown in FIG. 9(E) or 10(E) which is obtained from the amplifier 38 is supplied to one input terminal of a differential amplifier 39.

On the other hand, a control pulse which is recorded in a control track is picked up and reproduced by a control head 40, however, since the control head 40 is fixed, the control pulse has a repetition frequency respective of the tape speed. Hence, when the tape speed is $\frac{1}{2}$ that upon recording, the repetition frequency becomes $\frac{1}{2}$ times that of the drum pulse a as shown by f1 in FIG. 9(F). Similarly, when the tape speed is $\frac{1}{3}$ that upon recording, the repetition frequency becomes $\frac{1}{3}$ times that of the drum pulse a as shown by f2 in FIG. 10(F). The reproduced control pulse f1 (or f2) is converted into a wave g1 shown in FIG. 9(G) (or a wave g2 shown in FIG. 10(G)) by a waveform shaping circuit 41, and supplied to a phase adjusting circuit 42. The phase adjustment required for tracking and for slow-motion reproduction, are respectively performed at the phase adjusting circuit 42, which receives the output of a tracking volume 43.

The reproduced control pulse (pulse h1 shown in FIG. 9(H) in the case of $\frac{1}{2}$ speed slow-motion reproduction, and pulse h2 shown in FIG. 10(H) in the case of $\frac{1}{3}$ speed slow-motion reproduction) is supplied to a known capstan servo circuit (not shown) through an output terminal 44 on one hand, and supplied to a differentiating circuit 45 on the other. The reproduced control pulse h1 (or h2) thus supplied to the differentiating circuit 45 is differentiated, and only the differentiated pulse having positive polarity is applied to a set terminal SET of a filp-flop 47 through a diode 46, to set the flip-flop 47. This positive polarity differentiated pulse which is applied to the set terminal SET of the flip-flop 47, has a waveform shown by j1 in FIG. 9(J) upon $\frac{1}{2}$ speed slow-motion reproduction, and a waveform shown by j2 in FIG. 10(J) upon $\frac{1}{3}$ speed slow-motion reproduction. A positive polarity differentiated pulse obtained through a diode 50, of a differentiated pulse which is differentiated by a differentiating circuit 49 after reversing the polarity of the above square wave c at an inverter 48, is applied to a clear input terminal CL of the flip-flop 47. This positive differentiated pulse thus applied to the clear input terminal CL of the flip-flop 47, has a repetition frequency equal to that of the drum pulse a regardless of the variable speed ratio, and is shown by i in FIGS. 9(I) and 10(I).

Figure 10:
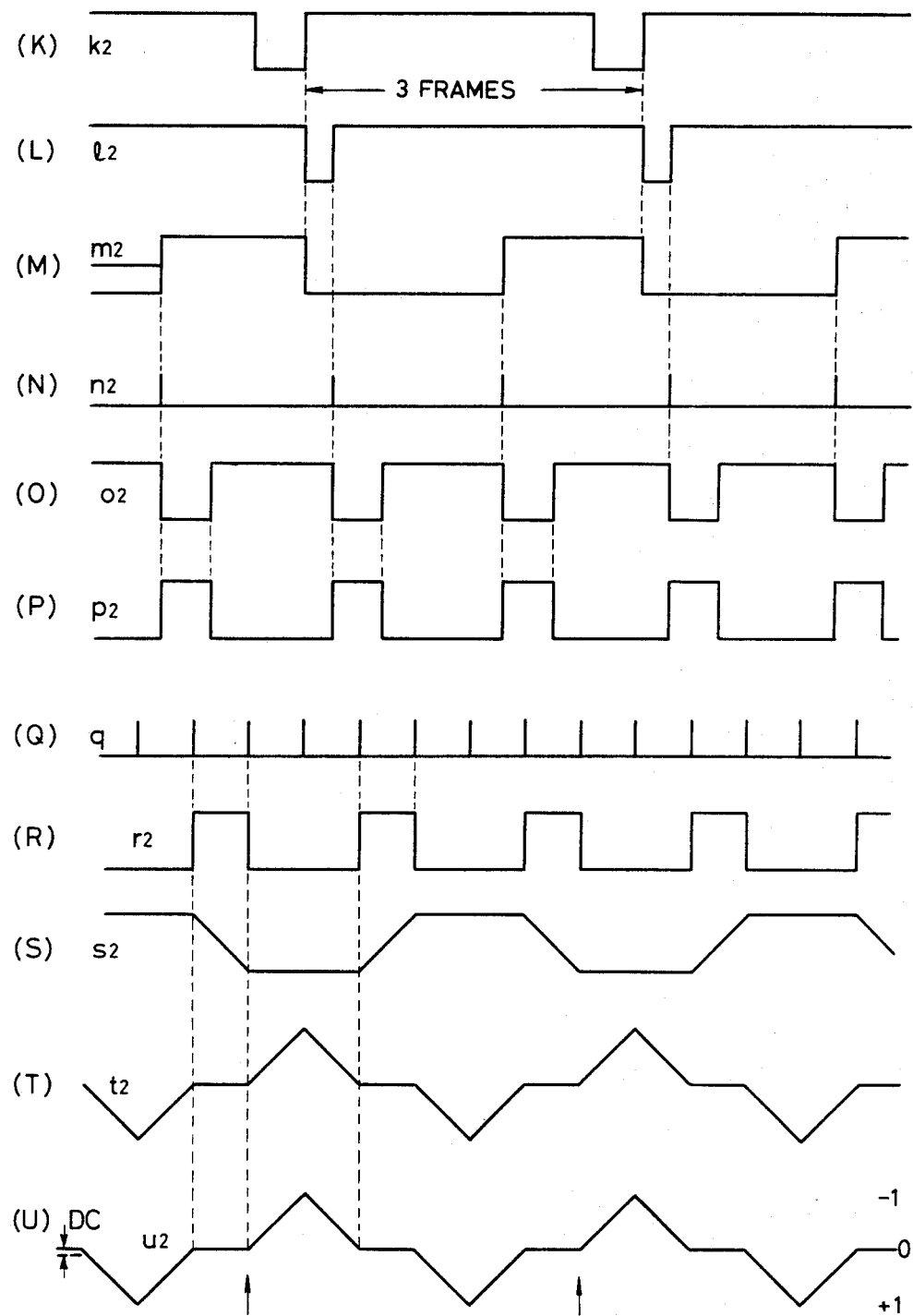

Accordingly, the output waveform obtained from an output terminal $\overline{Q}$ of the flip-flop 47 becomes as shown by k1 in FIG. 9(K) in the case of $\frac{1}{2}$ speed slow-motion reproduction, and as shown by k2 in FIG. 10($k$) in the case of $\frac{1}{3}$ speed slow-motion reproduction. The rising edge of the square wave k1 (or k2) is respective of the pulse i shown in FIG. 9(I) (or FIG. 10(I)). The square wave k1 (or k2) obtained from the output terminal $\overline{Q}$ of the flip-flop 47, is supplied to monostable multivibrators 51 and 52 having variable time constants, where the time constants are pre-established for every slow-motion speed, and triggers these multivibrators 51 and 52 at the rising edge of the square wave k1 (or k2). Therefore, the output signal waveform of the multivibrator 51 becomes as shown by l1 or FIG. 9(L) (or l2 in FIG. 10(L)), and the output signal waveform of the multivibrator 52 becomes as shown by m1 in FIG. 9(M) (or m2 in FIG. 10(M)). These square waves l1 and m1 (or l2 and m2) respectively pass through differentiating circuits 53 and 54, and diodes 55 and 56, to be mixed and formed into a pulse n1 shown in FIG. 9(N) (or a pulse n2 shown in FIG. 10(N)).

The above pulse n1 (or n2) is synchronized to the rising edges of the square waves l1 and m1 (or l2 and m2). The pulse n1 (or n2) is applied to a monostable multivibrator 57 as a trigger pulse, and is converted into a square wave o1 shown in FIG. 9(o) (or o2 shown in FIG. 10(o)). This multivibrator 57 is provided to compensate for the effects introduced due to temperature variations and the like in the multivibrators 51 and 52. The output square wave o1 (or o2) of the multivibrator 57 is supplied to an inverter 58 wherein the polarity of the wave thus supplied is reversed. Accordingly, a square wave p1 shown in FIG. 9(P) (or wave p2 shown in FIG. 10(P)) obtained from the inverter 58 is supplied to a switch 59. This switch 59 passes the input square wave p1 (or p2) to charge a capacitor 63, during the period in which an added pulse which is obtained by adding a positive polarity differentiated pulse obtained through a diode 61 after differentiating the square wave c at a differentiating circuit 60, and a positive polarity differentiated pulse obtained from the differentiating circuit 49 through a diode 62, that is, during the period in which an added pulse q shown in FIGS. 9(Q) which is synchronized with the rising and falling edges of the drum pulse c, is applied to the switch 59.

The switch 59, capacitor 63, and a field-effect-transistor (FET) 64 construct a first sample-and-hold circuit. This first sample-and-hold circuit produces a square wave r1 shown in FIG. 9(R) upon ½ speed slow-motion reproduction, and produces a square wave r2 shown in FIG. 10(R) upon ⅓ speed slow-motion reproduction. The rising and falling edges of the square wave r1 (or r2) are in complete synchronism with the phase adjusted drum pulse c and the tringular wave e. The square wave r1 (or r2) is applied to a switch 65 as a switching signal, and the switch 65 accordingly passes the above triangular wave e to charge a capacitor 66 during the period in which the switching signal is of high level. This switch 65, capacitor 66, and a field-effect-transistor (FET) 67 which is applied with the terminal voltage of the capacitor 66 to its gate, construct a second sample-and-hold circuit. The second sample-and-hold circuit produces a signal s1 shown in FIG. 9(S) upon ½ speed slow-motion reproduction, and produces a signal s2 shown in FIG. 10(S) upon ⅓ speed slow-motion reproduction.

The above signal s1 (or s2) is supplied to the other terminal of the differential amplifier 39, wherein the signal s1 (or s2) is differentially amplified together with the trigular wave e, into a signal t1 shown in FIG. 9(T) (or a signal t2 shown in FIG. 10(T)). The output signal of the differential amplifier 39 is supplied to a DC adjusting 68 and then to a current amplifying circuit 69. Therefore, a driving current 1 shown in FIG. 9(U) (or a driving current u2 shown in FIG. 10(U)) is obtained through at output terminal 70, and supplied to the driving coil 31 shown in FIG. 2. In FIGS. 9(U) and 10(U), arrows respectively show the rising positions of control pulses h1 and h2. In FIGS. 12B, 14B, 16B, and 18B, arrows also respectively show the rising positions of the control pulses.

The above description is for ½ and ⅓ speed slow-motion reproduction, however, the required driving current can also be formed by varying the time constants of the multi-vibrators 51 and 52 upon other slow-motion reproduction modes.

Figure 11:
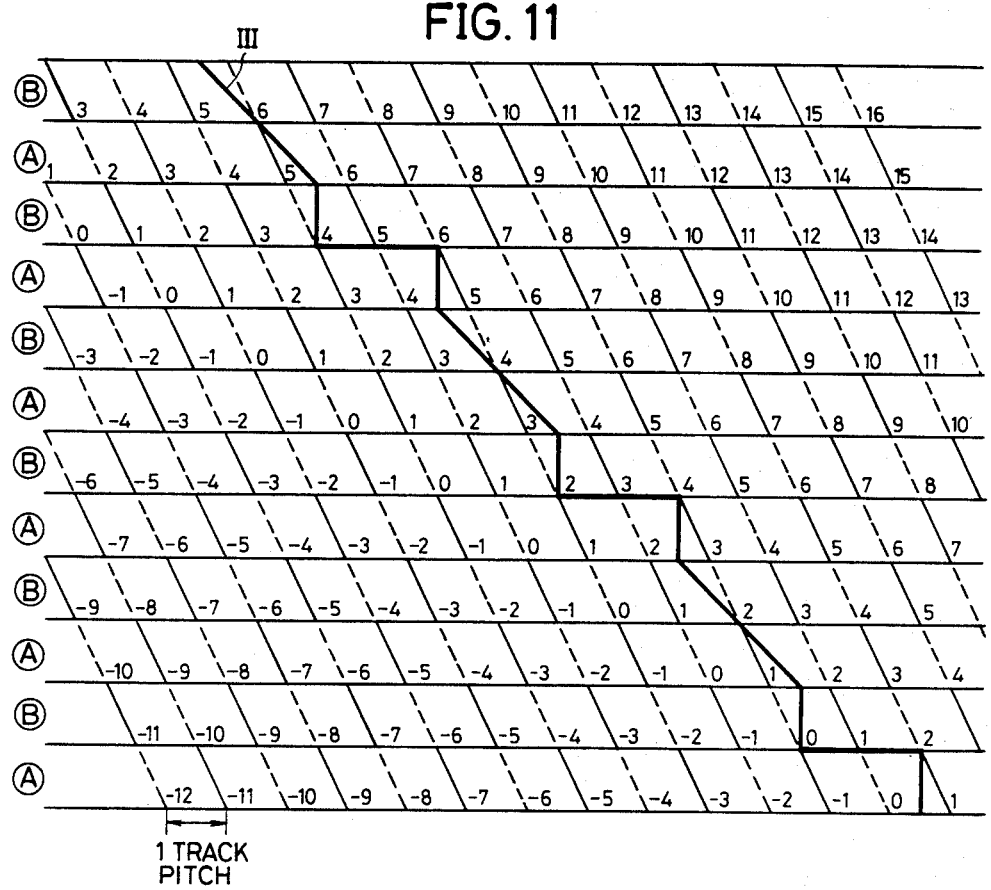
Figure 12A:
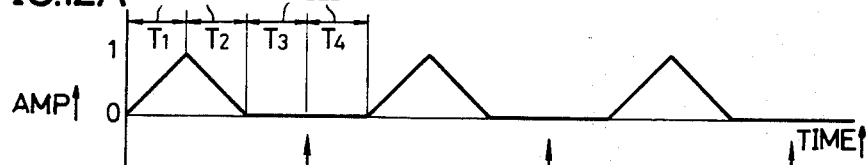

Next, description will be given on how the rotary heads are displaced to scan the tracks by use of the driving current produced by the above described open loop, and on the reproduced FM signal level which can be obtained by use of the present system. First, upon ½ speed slow-motion reproduction, the magnetic tape is moved at a speed which is ½ times that upon recording, and the driving current u1 shown in FIG. 9(U) is applied to the head moving mechanism 14. Accordingly, the rotary heads HA and HB respectively scan along a thick solid line III shown in FIG. 11. The driving current u1 is also shown in FIG. 12A.

The rotary head HA performs the reproduction in the first one track scanning period (one field scanning period) T1, however, the rotary head HA is at an intermediate position between the tracks "0" and "1". As the scanning progresses, the driving current shown in FIG. 12A is applied to the head moving mechanism 14, and the rotary head HA gradually is displaced towards the upward direction. Hence, at the final position of the first one track scanning period T1, the rotary head HA is displaced by one track pitch towards the upward direction, to a position to scan the whole track width of the track "2".

The rotary head HB then starts to perform reproduction, however, the height position of the rotary head HB is displaced in the opposite direction by the same amount the rotary head HA was displaced, due to the see-saw operation which was performed. That is, the rotary head HB is displaced towards the downward direction by one track pitch, from the neutral position. Accordingly, the rotary head HB is at the start of the track "0" which is recorded by a rotary head having the same azimuth angle as that of the rotary head HB, to scan the whole track width of the track "0". The driving current at this one track scanning period T2 gradually displaces the rotary head HA towards the downward direction by one track pitch (gradually displaces the rotary head HB towards the upward direction by one track pitch). Thus, due to the driving current shown in FIG. 12A, the rotary heads HA and HB are respectively positioned at the neutral positions at the final scanning position of the one track scanning period T2. Accordingly, in the one track scanning period T2, the area of the track "0" scanned by the rotary head HB decreases as shown in FIG. 11, and at the final scanning position, the rotary head HB is at an intermediate position between the tracks "1" and "2". Therefore, the reproduced FM signal level obtained from the track "0" gradually decreases to 50% from 100%.

Next, in the following one track scanning period T3 in which the rotary head HA performs the reproduction, reproduction is started from an intermediate position between the tracks "1" and "2", since the rotary head HA is positioned at the intermediate position at the final scanning position in the one track scanning period T2. The driving current produced at this one track scanning period T3 and in the following one track scanning period, which is shown in FIG. 12A, is to maintain the rotary heads HA and HB at the neutral positions. Accordingly, as shown in FIG. 11, at the one track scanning period T3, the rotary head HA starts scanning from the intermediate position between the tracks "1" and "2", along the track "1" which is recorded by a rotary head having the same azimuth angle as that of the rotary head HA, so that the area of the track "1" scanned by the rotary head HA gradually increases. Furthermore, in the following one track scanning period T4, the rotary head HB scans the track "2" which is recorded by a rotary head having the same azimuth angle as that of the rotary head HB, so that the area of the track "2" which is scanned by the rotary head HB gradually decreases. Thereafter the above described scanning operation is repeated.

Figure 12B:
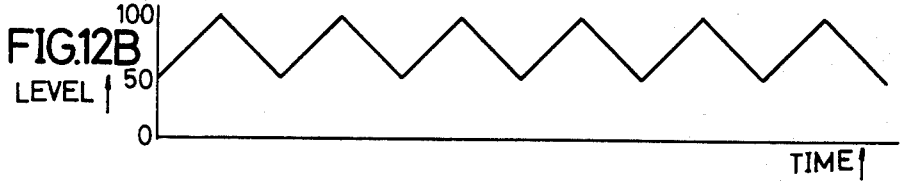

Therefore, upon ½ speed slow-motion reproduction, the variation in the reproduced FM signal level obtained by the rotary heads HA and HB becomes as shown in FIG. 12B. That is, the minimum and maximum variation in the reproduced FM level are 50%. Accordingly, compared to the case shown in FIG. 5B, a fine slow-motion reproduction picture can be obtained comprising no noise bar.

Upon ⅓ speed slow-motion reproduction, the magnetic tape is moved at a speed which is ⅓ that upon recording, and the driving current u2 shown in FIG. 10(U) (also shown in FIG. 14A) is applied to the head moving mechanism 14. Therefore, the rotary heads HA and HB respectively scan the tracks as shown by a thick solid line IV in FIG. 13. In the first one track scanning period T1a, the driving current shown in FIG. 14A displaces the rotary head HA towards the upward direction from the neutral position, and at the final scanning position, the rotary head HA is displaced towards the upward direction by one track pitch. Hence, in the period indicated by T1a in FIG. 13, the rotary head HA starts scanning and reproducing the track "1" from a position which is shifted by ⅓ track pitch towards the downward direction from the track "1", and the area of the track "1" which is scanned by the rotary head HA gradually increases. Thus, at the final scanning position in the one track scanning period T1a, the rotary head HA scans the whole track width of the track "1".

In the next one track scanning period T2a, the rotary head HB performs the reproduction. However, immediately before the reproduction is started, the rotary head HA is controlled to a height position shifted by one track pitch towards the upward direction from the neutral position. Accordingly, the rotary head HB is at a height position shifted by one track pitch towards the downward direction from the neutral position due to the see-saw operation, and starts reproduction from a starting position of the track "0" to scan the whole width of the track "0". The driving current shown in FIG. 14A during the one track scanning period T2a gradually displaces the rotary head HA towards the downward direction, and at the final scanning position in the one track scanning period T2a, the rotary heads HA and HB are displaced to the neutral positions. Therefore, the area of the track "0" scanned by the rotary head HB during the period T2a gradually decreases, and at the final scanning position, the rotary head HB is shifted towards the upward direction by ⅓ track pitch.

In the following one track scanning period T3a, the driving current shown in FIG. 14A maintains the rotary heads HA and HB at the neutral positions. Accordingly, the rotary head HA crosses track "1" as shown in FIG. 13 to reproduce the track "1". Further, in the following one track scanning period T4a, the driving current shown in FIG. 14A gradually displaces the rotary head HA towards the downward direction to a height position shifted by one track pitch from the neutral position. This means that the ortary head HB is gradually displaced towards the upward direction from the neutral position in this period T4a. Thus, the rotary head HB performs reproduction wherein the area of the track "2" scanned by the rotary head HB gradually increases as shown in FIG. 13. From then on, the tracking performed by the rotary heads HA and HB are alternately controlled by the driving current shown in FIG. 14A.

Hence, the reproduced FM level varies as shown in FIG. 14B upon ⅓ speed slow-motion reproduction. Accordingly, although the waveform of the driving current is relatively simple, a ⅓ speed slow-motion reproduction of high quality can be performed.

Upon ¼ speed slow-motion reproduction, the driving current is produced as shown in FIG. 16A, and the rotary heads HA and HB respectively scan the magnetic tape as shown by a thick solid line V in FIG. 15. The reproduced FM level accordingly becomes as shown in FIG. 16B. On the other hand, upon 1/5 speed slow motion reproduction, the driving current is produced as shown in FIG. 18A, and the rotary heads HA and HB respectively scan the magnetic tape as shown by VI in FIG. 17. The reproduced FM level in this case becomes as shown in FIG. 18B. As clearly seen in FIGS. 16B and 18B, the minimum value of the reproduced FM level is more than 50% of the maximum value, and a high quality slow-motion reproduction picture having no noise bar can be obtained.

In the above embodiments of the invention, the control pulse supplied to the capstan servo is produced when one of the rotary heads HA and HB makes contact with the magnetic tape at the starting position of a track which is recorded by the rotary head HB, to scan the whole width of the track. This is due to the relationship between the mechanical mounting positions of the rotary heads HA and HB and the control head 40 of the VTR to which the embodiments of the invention were applied, as clearly seen from FIGS. 11 through 18B. Upon ⅓ speed slow-motion reproduction shown in FIG. 13, the phase of the reproduced control pulse which is originally supplied to the capstan servo, is deviated by one field, or by 180 degrees. This operation is performed in order to obtain a phase state shown in FIG. 13.

A general condition for the driving signal (current) waveform which is to be applied to the head moving mechanism 14 becomes as follows, when the cases described above in conjunction with FIGS. 12A, 14A, 16A, and 18A are considered.

As a fundamental condition, the driving signal is produced by use of the information supplied by the reproduced control pulse and the drum pulse. The following are the required conditions for the driving signal waveform upon 1/N speed slow-motion reproduction.

(1) The driving signal waveform changes in units of fields.

(2) The period of the driving signal waveform is 2N fields.

(3) There are two positions (fields) within one period where the rotary heads are held at the neutral positions, and the interval between these positions (fields) is close of N fields as much as possible.

(4) The rotary head HA is gradually displaced towards the upward direction by a total of one track pitch in the field which the rotary head HA is reproducing, and the rotary head HB is gradually displaced towards the upward direction by a total of one track pitch in the field which the rotary head HB is reproducing, within one period other than the field period specified by the above (3).

Assuming that the most suitable state is zero degree upon normal reproduction, the phase of the drum pulse respective of the controlpulse which is supplied to the capstan servo must be zero or 180 degrees when $N=2n$ (n is an integer), 180 degrees when $N=4n-1$, and zero degree when $N=4n+1$. Furthermore, instead of setting the phase of the drum pulse to 180 degrees, the phase of the drum pulse can be differed by one field from the original phase, by electrically processing the drum pulse.

Since the driving signal waveform is continuous in the above described embodiments of the invention, the tracking becomes partially off from the ideal tracking, and this was the reason for the change in the reproduced FM level as shown in FIGS. 12B, 14B, 16B, and 18B. An evaluation factor $\alpha$ for evaluating the logic value of the reproduced FM level is described by the following equation.

$$\alpha = MIN \times \overline{av}$$

In the above equation, $\alpha$ represents the evaluation factor, MIN represents the minimum value of the reproduced FM level, and $\overline{av}$ represents the average value of the reproduced FM level. When the above evaluation factor $\alpha$ and the like is applied to the above cases in which 1/2, 1/3, 1/4, and 1/5 speed slow-motion reproduction is performed, the following relationships shown in Table 1 can be obtained.

TABLE 1

|  | MIN (%) | $\overline{av}$ (%) | $\alpha$ |
|---|---|---|---|
| 1/2 speed | 50.0 | 75.0 | 32.5 |
| 1/3 speed | 66.7 | 83.3 | 55.6 |
| 1/4 speed | 50.0 | 79.2 | 39.6 |
| 1/5 speed | 60.0 | 80.0 | 48.0 |

It is evident from Table 1 that the $1/2n+1$ speed slow-motion reproduction is more advantageous compared to the $1/2n$ speed slow-motion reproduction. This due to the fact that the above condition (3) for the driving signal waveform is well satisfied in the case of the $1/2n+1$ speed slow-motion reproduction. That is, in the case of $1/2n+1$ speed slow-motion reproduction, the interval between the two positions described in the above condition (3) becomes equal to N.

Figure 19:
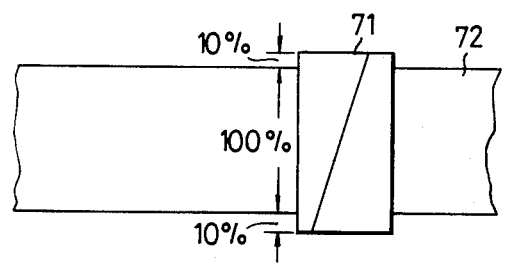
FIG. 19 is a diagram showing another example of a rotary head which is to be used with the tracking system of the present invention, respective of the recording track.

The above description was for cases in which the track widths of the rotary heads HA and HB are equal to the track pitch, however, description will now be given for a case in which the rotary heads HA and HB are the so-called wide rotary heads of which gap width is wider than the track width. If the width of a track 72 shown in FIG. 19 is assumed to be 100%, for example, and a wide head 71 having a track width of 120% is used, a margin of 10% is obtained in both the upward and downward direction of the track as shown in FIG. 19, when the center lines of the track width of the wide head 71 and the track 72 coincides. Accordingly, when a positional error of 50% exists, the reproduced FM level is only decreased by 40%. Hence, the evaluation factor $\alpha$ becomes as shown in Table 2 in the case where the wide head 71 is used.

TABLE 2

|  | MIN (%) | $\overline{av}$ (%) | $\alpha$ |
|---|---|---|---|
| 1/2 speed | 60.0 | 84.0 | 50.4 |
| 1/3 speed | 76.7 | 91.8 | 70.4 |
| 1/4 speed | 60.0 | 88.6 | 53.2 |
| 1/5 speed | 70.0 | 88.8 | 62.1 |

As clearly seen from Tables 1 and 2, the reproduced FM level can be greatly improved when slightly wider heads are used.

Figure 20:
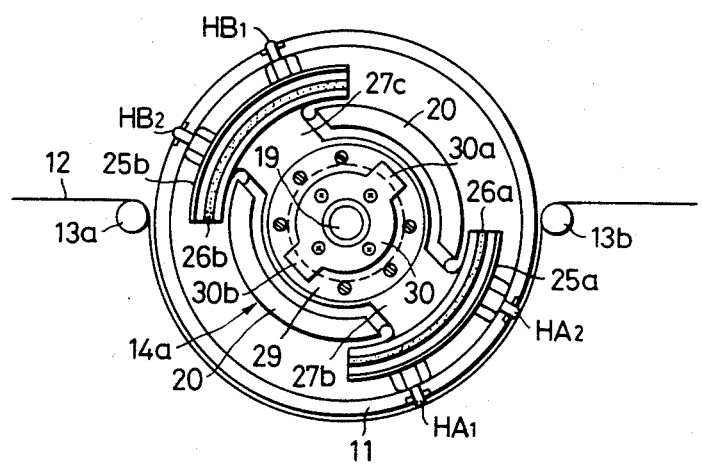
FIG. 20 is a plan view showing another example of a head moving mechanism which can be applied to the tracking system of the present invention.

The waveform of the driving signal is not limited to those shown in FIGS. 12A, 14A, 16A, 18A, 9(U), and 10(U), as long as the above described conditions on the waveform and the phase of the driving signal is satisfied. Furthermore, description was given for a case where two rotary heads are used, however, the number of the rotary heads are not limited to two. The system according to the present invention can also be applied to a case where rotary heads HA1 and HB1 for performing two hours of recording or reproduction and rotary heads HA2 and HB2 for performing six hours of recording and reproduction, are respectively arranged and provided in mutually opposite positions as shown in FIG. 20. In this case, these heads HA1, HB1, HA2, and HB2 are respectively displaced by use of a head moving mechanism 14a.

The head moving mechanism for displacing the rotary heads HA and HB (or HA1, HB1, HA2, HB2) in a plane which is perpendicular to the rotating plane of the rotary heads, is not limited to the above described head moving mechanism which performs a see-saw operation. The system according to the present invention can also be applied to a VTR which is capable of performing slow-motion reproduction in the reverse direction. Moreover, the system according to the present invention can also be applied to a case where, a magnetic tape in which a PCM signal is recorded in a signal format which approximates a video signal.

Further, this invention is not limited to these embodiments but various variations and modifications may be made without departing from the scope of the invention.

What is claimed is:

1. A tracking system for use in a rotary magnetic type recording and/or reproducing apparatus, said apparatus having two opposing rotary heads mounted on opposite sides of a rotary body either for alternately and successively recording signals in oblique tracks on a recording medium, the tracks being oblique with respect to the longitudinal direction of said recording medium or for alternately scanning over said oblique tracks on said recording medium to reproduce recorded signals, moving means for continuously moving said recording medium past said rotary heads, a magnetic head moving mechanism comprising a combination of a coil and a magnet for displacing said two rotary heads at substantially the same time with said displacement being in mutually opposite directions and by the same amount, the displacement being in a plane which is perpendicular to a plane in which said rotary heads rotate, said heads moving in response to an externally supplied driving signal, and a control head for recording a control pulse having a predetermined period onto said recording medium, said tracking system comprising:

driving signal producing circuit means for producing a driving signal having a waveform which gradually changes in amplitude with respect to one track scanning period of said rotary heads, said changing amplitude of said waveform moving said rotary heads gradually during reproduction in which said recording medium is continuously moved by said moving means at a speed which is different from the speed used during recording, said driving signal producing circuit comprising circuit means for producing a first signal having a triangular waveform derived from a pulse obtained by detecting the rotation of said rotary body, sample-and-hold means for producing a second signal having a waveform which is a modification of the triangular waveform of said first signal, said sample-and-hold means being operated responsive to said pulse obtained by detecting the rotation of said rotary body and to a control pulse reproduced from said control head, and composition means for adding said first and second signals to obtain said driving signal; and supplying means for supplying said driving signal from said driving signal producing circuit means to said magnetic head moving mechanism.

2. A tracking system as claimed in claim 1 in which:
said moving means continuously moves said recording medium at a speed which is 1/N (N is an integer) times the speed that was used during recording; and said driving signal producing circuit means produces a driving signal which is a continuous wave having a period equal to 2N track scanning period, the magnetic head moving mechanism holding height positions of said rotary heads at mutually equal neutral positions for an interval corresponding to a total of two track scanning periods so that said rotary heads scan in their neutral positions for the interval corresponding to a total of two track scanning periods during every 2N track scanning period, said magnetic head moving means gradually displacing one of said two opposing rotary heads toward one direction by a total of one track pitch during the period in which said one rotary head is performing a reproduction during a first displacing period, and gradually displaces the other of said two opposing heads toward said one direction by a total of one track pitch during the period in which said other rotary head is performing reproduction during a second displacing period.

3. A tracking system as claimed in claim 2 which further comprises a phase adjusting circuit for performing phase adjustment on said driving signal beforehand, to compensate for the time lag from the time said driving signal is supplied to said magnetic head moving mechanism until said rotary heads actually are displaced according to said driving signal.

4. A tracking system as claimed in claim 2 which performs tracking upon 1/N speed slow-motion reproduction by setting the phase of the pulse obtained by detecting the rotation of said rotary body with respect to said control pulse, to zero or 180 degrees when $N=2n$ where n is an integer, or to 180 degrees when $N=4n-1$, or to zero when $N=4n+1$, where a level of FM signal reproduced by said rotary heads during normal reproduction is maximum when the phase of the pulse is zero.

5. A tracking system as claimed in claim 2 in which said rotary heads scan in their neutral positions during two separate one track scanning periods, and said two separate one track scanning periods are separated by an interval corresponding to N track scanning period when N is an odd number.

* * * * *